United States Patent [19]

Kocisek

[11] Patent Number: 5,509,752
[45] Date of Patent: Apr. 23, 1996

[54] ARRANGEMENT COMPRISING A SHAFT, A HUB MOUNTED ON THE SHAFT BY MEANS OF AN ELASTICALLY EXPANSIBLE CLAMPING MEMBER, AND AN EXPANSION DEVICE FOR EXPANDING THE CLAMPING MEMBER

[75] Inventor: Karl Kocisek, Haslau, Austria

[73] Assignee: U.S. Philips Corporation, New York, N.Y.

[21] Appl. No.: 453,291

[22] Filed: May 30, 1995

Related U.S. Application Data

[63] Continuation of Ser. No. 114,544, Aug. 31, 1993, abandoned.

[30] Foreign Application Priority Data

Oct. 14, 1992 [AT] Austria ..................................... 2024/92

[51] Int. Cl.$^6$ .............................. G11B 5/105; F16B 7/04; F16B 2/06
[52] U.S. Cl. ............................ 403/373; 360/84; 403/372; 403/365; 403/19; 403/261; 403/256; 403/326; 411/518; 411/353
[58] Field of Search .................................. 29/525.1, 450, 29/229, 243.56; 403/365–367, 372–374, 297, 290, 196, 197, 199, 187, 193, 19, 281, 282, 278, 261, 256, 326; 24/30.5 R, 17 B, 127, 129 R, 546, 547; 411/518, 352, 353; 360/104, 109, 84

[56] References Cited

U.S. PATENT DOCUMENTS

| | | | |
|---|---|---|---|
| 436,357 | 9/1890 | King | 403/367 |
| 3,030,700 | 4/1962 | Jensen | 29/229 |
| 3,199,181 | 8/1965 | Erdmann et al. | 29/229 |
| 3,982,723 | 9/1976 | Ford et al. | 29/450 |
| 4,321,639 | 3/1982 | Aarts et al. | 360/104 |
| 4,464,690 | 8/1984 | Hanecka et al. | 403/373 |
| 4,479,157 | 10/1984 | Aarts et al. | 360/104 |
| 4,507,696 | 3/1985 | Hütter | 360/104 |
| 4,689,865 | 9/1987 | Chamblee | 29/229 |
| 4,844,677 | 7/1989 | Schwartzman | 411/353 |

FOREIGN PATENT DOCUMENTS

| | | | |
|---|---|---|---|
| 365808 | 2/1982 | Australia. | |
| 92202452.2 | 8/1991 | Australia. | |
| 539172 | 12/1976 | U.S.S.R. | 411/518 |
| 2157786 | 10/1985 | United Kingdom | 411/353 |

Primary Examiner—Anthony Knight
Attorney, Agent, or Firm—Brian J. Wieghaus

[57] ABSTRACT

In an arrangement (1) comprising a shaft and a part having a hub (57) mounted on the shaft and comprising at least one tubular portion to be clamped onto the shaft, and a clamping member, which can be mounted on said tubular member (72, 73) comprises three inwardly directed clamping zones which are equispaced at angles of 120° from one another and which are each movable in a radial direction. The clamping member and its three clamping zones are situated at the same level perpendicular to the shaft and the clamping member is constructed to be elastically deformable in radial directions and in addition comprises three application zones for an expansion device (150), which application zones are also equispaced at angles of 120° from one another and are each movable in a radial direction.

30 Claims, 5 Drawing Sheets

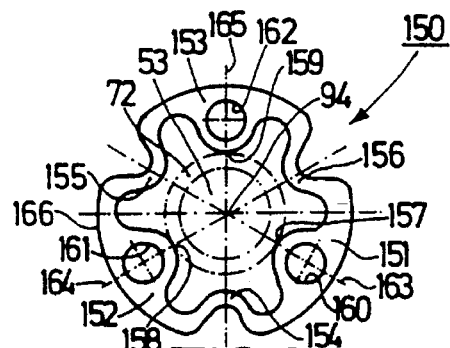
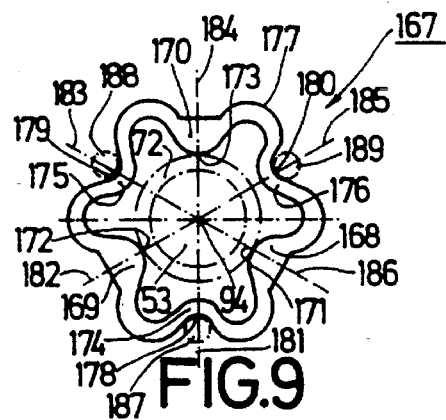
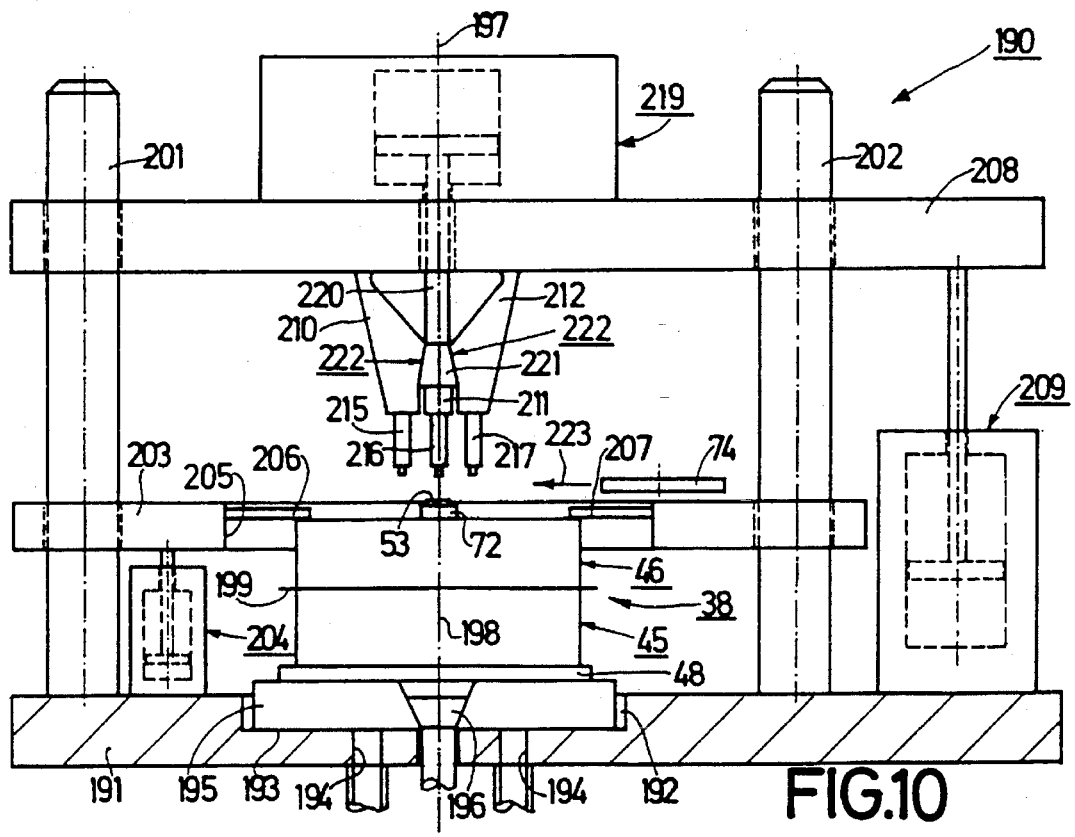

ARRANGEMENT COMPRISING A SHAFT, A HUB MOUNTED ON THE SHAFT BY MEANS OF AN ELASTICALLY EXPANSIBLE CLAMPING MEMBER, AND AN EXPANSION DEVICE FOR EXPANDING THE CLAMPING MEMBER

This is a continuation of application Ser. No. 08/114,544, filed Aug. 31, 1993, now abandoned.

BACKGROUND OF THE INVENTION

The invention relates to an arrangement comprising a shaft and a part having a hub mounted on the shaft and comprising at least one tubular portion which is coaxial with the shaft and is constructed to be elastically deformable in radial directions, which tubular portion is acted upon by at least one releasible clamping member in order to be clamped onto the shaft, which clamping member can be mounted on said tubular member and surrounds it in a ring-like manner and comprises three inwardly directed clamping zones which are equispaced at angles of 120° from one another and are each movable in a radial direction.

The invention further relates to a clamping member for such an arrangement, which clamping member is of a ring-like construction in relation to an axis of symmetry and which comprises three inwardly directed clamping zones which are equispaced at angles of 120° from one another and are each movable in a radial direction.

The invention further relates to an expansion device for moving the application zones of such a clamping member of such an arrangement.

An arrangement of the type defined in the opening paragraph is known, for example from AT 365.808 B, which is herewith incorporated by reference. This known arrangement concerns a recording and reproducing apparatus for picture and sound signals, which can be recorded on and reproduced from a magnetic tape. For this purpose the apparatus comprises a drum-shaped scanning device around which the magnetic tape is partly wrapped in a helical path, which scanning device has a drum-shaped pan which is clamped onto a rotatable shaft by means of a clamping member and which forms a head support carrying the magnetic heads for scanning the magnetic tape and for recording and reproducing picture signals. The clamping member is formed by a flat ring which is substantially non-deformable in radial directions and from which three clamping tongues project inwardly towards a tubular portion of a hub of the head support, the clamping tongues being inclined relative to the plane of the flat ring and having free ends, forming clamping surfaces, which bear on a step of the tubular portion. During the manufacture of this clamping member an additional operation is required to provide the inclination of the clamping tongues, which is a disadvantage. Moreover, the inclination of the clamping tongues is tolerance dependent to a comparatively large extent, so that the clamping forces which can be applied by means of such clamping member exhibit a comparatively large spread and, consequently, no precise and reproducible clamping is possible. For moving the free ends of the three clamping tongues in radial directions relative to the tubular projection, in order to clamp the tubular projection onto the shaft, the known arrangement comprises an axially adjustable screwthreaded ring which acts on the ring forming the clamping member via a compression ring, an axial displacement of the screwthreaded ring, the compression ring and the clamping-member ring causing the inclination of the three clamping tongues to be changed, thereby moving the free ends of the three clamping tongues in radial directions. When the tubular portion in this known arrangement is clamped onto the shaft the head support should be retained both axially and tangentially relative to the shaft, so that during clamping the head support is subjected to external forces both in the axial and in the tangential direction. These external forces make it difficult to achieve a trouble-free and exact clamping with a minimal axial and a minimal radial runout. Moreover, this known construction leads to undefined frictional forces in the area between the screwthreaded ring, the compression ring and the clamping-member ring and in the area between the free ends of the clamping tongues and the step of the tubular portion, which forces are adverse to the obtainment of accurately defined, mutually equal and reproducible clamping forces for clamping the tubular portion onto the shaft. In addition, the inclination of the three clamping tongues in the prior-art construction gives rise to axial force components between the clamping tongues and the tubular portion, which in the long run may result in an undesirable axial displacement of the head support along the shaft. Another disadvantage of the prior-art construction is that a comparatively large number of pans are required for clamping the tubular portion onto the shaft and the clamping process is comparatively difficult to mechanize.

SUMMARY OF THE INVENTION

It is an object of the invention to preclude the above problems and to improve an arrangement of the type defined in the opening paragraph in such a manner that substantially no or only negligible external forces are exerted on a part of the arrangement when a tubular portion of the hub of this pan is clamped onto a shaft, no undefined frictional forces occur, the clamping projections do not exert any axial force components on the tubular portion, clamping is possible with a small number of parts, and clamping can be effected easily in a mechanized process.

To this end the invention is characterized in that the clamping member and its three clamping zones are situated at the same level perpendicular to the shaft, and the clamping member is constructed to be elastically deformable in radial directions and in addition comprises three application zones for an expansion device, which application zones are also equispaced at angles of 120° from one another and are each movable in a radial direction, each application zone and at least one clamping zone being associated with one another.

In this way it is achieved that when a tubular portion of the hub of a part is clamped onto a shaft the part requires only very small forces to position it during clamping and no large forces are needed to hold it, because during clamping of the tubular portion onto the shaft no or only negligibly small forces are exerted on the part and the ring-like clamping member merely has to be expanded by means of the expansion device by the application of comparatively large forces, the reactive forces which then occur being taken up wholly by the expansion device only. Thus, the part is subjected to no external forces at all or only to negligibly small external forces, which is advantageous in order to achieve a trouble-free and exact clamping with a minimal axial and a minimal radial runout. Moreover, by expanding the ting-like clamping member during a clamping process it is achieved that, without mechanical contact with the tubular portion, the clamping member can be brought to its clamping level area on the tubular portion, after which it is movable in exactly radial directions relative to the tubular portion with its clamping projections, so that no undefined fictional forces occur between the free ends of the clamping projections and the tubular portion, always resulting in accurately defined clamping forces which are equal to each other and which are always reproducible. The one-level construction of the clamping member and its clamping projections and the movability of the clamping projections in exactly radial directions also ensure that the clamping forces act only in exactly radial directions and that no force components in axial directions occur, so that also in the long run the part does not tend to be displaced along the shaft in the axial direction. Moreover, the advantage is obtained that only a single clamping member is needed for clamping a tubular portion onto the shaft and this single clamping member enables clamping to be effected very easily and simply in a mechanized process.

It is then found to be very advantageous if the hub of the part comprises a substantially non-deformable central portion from which two tubular portions, which are coaxial with the shaft, project in opposite axial directions, a clamping member acting upon each annular portion, and each of the two clamping members having three clamping zones which are equispaced at angles of 120° from one another and which are situated at the same level as the clamping member, and three application zones for an expansion device, which application zones are also equispaced at angles of 120° from one another. In this way it is achieved that such a pan is clamped very accurately and reliably on a shaft.

In this respect it is found to be very advantageous if the two clamping members are constructed to apply clamping forces of different magnitude. This results in a fixed support being achieved at the location of the thicker clamping member, so that the pan is securely fixed at a given axial level at this location, and in a sliding support at the location of the thinner clamping member, so that an exact radial positioning of the pan is obtained at this location but advantageously an axial movement remains possible.

In this respect its is also found to be very advantageous if one clamping member is made of spring steel and the other clamping member is made of spring bronze. In this way it is achieved that the clamping members of the arrangement are made of commercially available materials and that owing to the different materials different clamping forces can be obtained with clamping members of the same shape.

Moreover, it is found to be very advantageous if the pan has three passages which traverse the pan in the axial direction and which are equispaced at angles of 120° from one another, and three expansion mandrils of an expansion device are adapted to cooperate with the three application zones of a clamping member of the arrangement through the three passages. In this way it is achieved that for clamping or releasing the two clamping members of an arrangement the expansion device required for this can cooperate with the two clamping members from the same side relative to the part.

A clamping member of the type defined in the second paragraph is known from, for example, AT 365. 808 B. This known clamping member is formed by a flat ring which is substantially non-deformable in radial directions and from which three clamping tongues project inwardly and are inclined relative to the plane of the flat ring, which tongues have free ends forming clamping surfaces. During the manufacture of this clamping member an additional operation is required to provide the inclination of the clamping tongues, which is a disadvantage. Moreover, the inclination of the clamping tongues is tolerance dependent to comparatively large extent, so that the clamping forces which can be applied by means of such clamping member exhibit a comparatively large spread and, consequently, no precise and reproducible clamping is possible.

A clamping member in accordance with the invention for an arrangement in accordance with the invention is characterized in that the clamping member and its three clamping zones are situated at the same level perpendicular to the axis of symmetry, and the clamping member is constructed to be elastically deformable in radial directions and in addition comprises three application zones for an expansion device, which application zones are also equispaced at angles of 120° from one another and are each movable in a radial direction, each application zone and at least clamping zone being associated with one another. Such a clamping member can be manufactured very simply, for example from a sheet material in a single punching operation, and can be of a very simple construction. By means of such a clamping member, the clamping forces to be exerted by it can be applied exactly perpendicularly to an axis of symmetry and the clamping forces always have the same magnitude, which is advantageous for a precise and reproducible clamping.

With such a clamping member in accordance with the invention, it is found to be advantageous with respect to the location of an application zone and the associated at least one clamping zone if each application zone and its associated clamping zone are situated on a radial line, so that each application zone and its associated clamping zone can be moved in the same direction by means of an expansion device. This results in a direct allocation of an application zone to a clamping zone.

If an application zone and its associated clamping zone are situated on one radial line it is found to be advantageous if the clamping member is substantially non-deformable in radial directions in its three areas which each have an application zone and a clamping zone associated with said application zone, and is elastically deformable in radial directions in the parts situated between the said three areas. This is advantageous in view of an optimum elastic deformability of the clamping member.

If an application zone and its associated clamping zone are situated on one radial line it is found to be very advantageous if a radial slot, which traverses the clamping member in the axial direction, extends from each application zone in the clamping member up to the outer bounding wall of the clamping member. This is advantageous in view of a maximal elastic deformability of the clamping member.

If an application zone and its associated clamping zone are situated on one radial line it is also found to be very advantageous if each application zone is formed by the bounding wall of a hole traversing the clamping member in the axial direction. This is advantageous for a very simple realization of the application zones, an as uniformly as possible expansion of the clamping member, and a particularly reliable cooperation of an expansion device with the application zones.

With respect to the location of an application zone and its associated at least one clamping zone, it is also found to be advantageous for a clamping member in accordance with the invention if one application zone and one of the two associated clamping zones are situated on two radial lines which enclose an angle of 60° with one another, each application zone and the two clamping zones associated therewith being movable in opposite directions by means of an expansion device. In this way, an application zone is associated with two clamping zones each arranged at an angular spacing of 60° from this application zone and the clamping zones can be moved away from a tubular portion by moving the application zones towards the tubular portion.

If an application zone and its two associated clamping zones are each situated on one of three radial lines which are spaced 60° from one another it is found to be very advantageous if the clamping member is substantially non-deformable in radial directions in its three areas having one clamping zone each and has portions which are elastically deformable in radial directions between said three areas and which are shaped as two bulges directed away from the axis of symmetry of the clamping member and having between the two bulges a dale directed towards the axis of symmetry, and in the dale between the two bulges of each of the portions which are elastically deformable in radial directions the outer bounding wall of the clamping member forms an application zone for an expansion device. This is advantageous for a simple application to and cooperation of an expansion device with the application zones of such a clamping member.

An expansion device for moving the application zones of a clamping member according to the invention of an arrangement in accordance with the invention is characterized in that the expansion device comprises three expansion mandrils, which are equispaced at angles of 120° from one another with respect to an axis of symmetry, which can be aligned with the axis of the shaft carrying the hub of the part of the arrangement, and an actuating device for the expansion mandrils, by means which actuating device each of the three expansion mandrils is movable in a radial direction relative to the axis of symmetry at least with a free end which is adapted to cooperate with an application zone of a clamping member of the arrangement. Such an expansion device enables a clamping member according to the invention of an arrangement in accordance with the invention to be expanded in a simple and reliable manner in order to mount the clamping member on or remove it from a tubular portion.

In this respect it is found to be very advantageous if each expansion mandril is secured to a holder which is arranged on a holder mount of the expansion device so as to be movable in a radial direction relative to the axis of symmetry. This is advantageous for a reliable mounting and actuation of the expansion mandrils of the expansion device.

It is then also found to be very advantageous if the holder mount is guided so as to be movable in the direction of the axis of symmetry. This is advantageous for a very simple displacement of the expansion mandrils in relation to a part to be clamped onto a shaft.

In this respect it is also found to be very advantageous if a link motion is arranged between each holder, which is movably connected to the holder mount, and an actuating device of the expansion device, which actuating device is movable relative to the holder mount in the direction of the axis of symmetry, which link motion enables the holders and at least the free ends of the expansion mandrils secured to said holders to be moved in a radial direction relative to the axis of symmetry when the actuating device is moved in the direction of the axis of symmetry. This is advantageous for a simple actuation of the expansion mandrils of the expansion device.

BRIEF DESCRIPTION OF THE DRAWINGS

In the drawing:

FIG. 8 shows, similarly to FIGS. 4 to 7, a clamping member in accordance with a fourth variant.

FIG. 9 shows, similarly to FIGS. 4 to 8, a clamping member in accordance with a fifth variant.

FIG. 10 is a partly sectional diagrammatic side view showing an expansion device for expanding a clamping member in accordance with the invention as shown in FIGS. 4, 5, 6, 7 and 8.

DETAILED DESCRIPTION OF THE INVENTION

Figure 1:
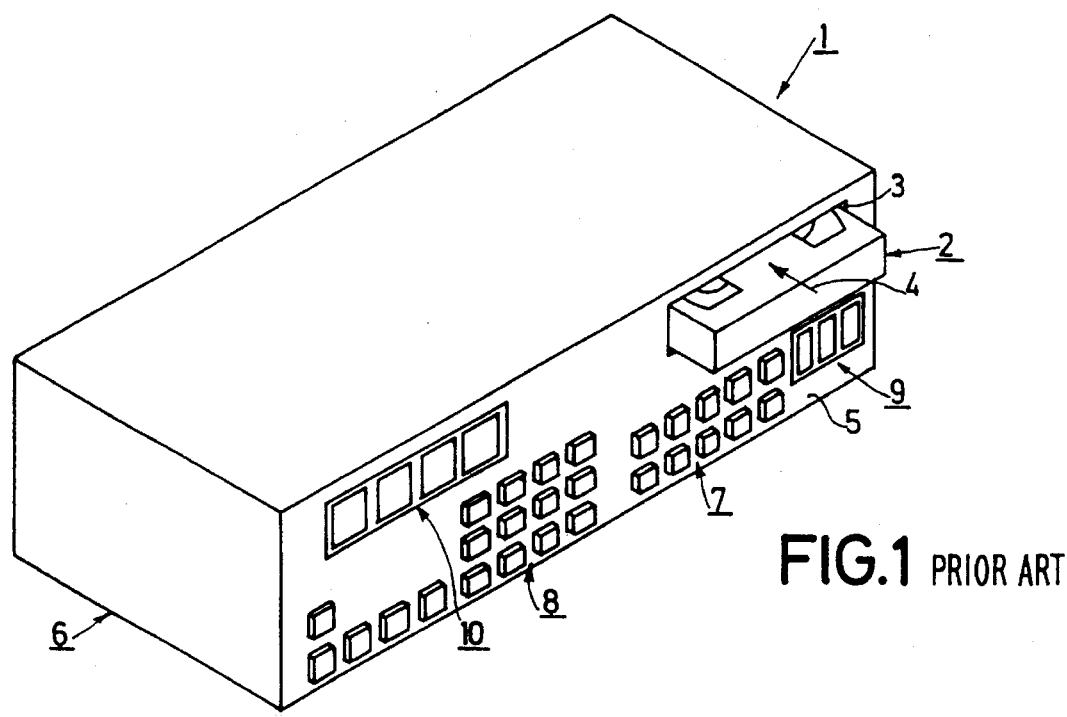
FIG. 1 is a reduced-scale diagrammatic oblique view of an apparatus for recording and reproducing television signals and audio signals, which apparatus is constructed to receive a cassette accommodating a magnetic tape which extends between two reel hubs and on/from which television signals can be recorded and reproduced in inclined tracks by means of rotatable magnetic heads.

The invention will now be described in greater detail with reference to the figures of the drawing.

FIG. 1 shows an apparatus 1 for recording and reproducing television signals and audio signals on a magnetic tape, which apparatus is generally referred to briefly as a video recorder. The magnetic tape is accommodated in a cassette 2 which is shown diagrammatically in FIG. 1. The cassette 2 can be inserted by hand into the apparatus 1 in the direction indicated by an arrow 4 through an opening 3, which can be closed by a cover which can be swung into the interior of the apparatus. The opening 3 is provided in a front wall 5 of the housing 6 of the apparatus 1. When the cassette 2 is loaded into the apparatus 1 it is inserted into a movable cassette holder which, after complete insertion of the cassette 2 into this apparatus, first moves the cassette parallel to the cassette main walls and then lowers it perpendicularly to the cassette main walls into an operating position inside the apparatus along an L-shaped path of movement. In this operating position the cassette 2 is positioned and movable tape guides of a tape threading device enter the cassette 2 to extract the magnetic tape from the cassette 2 and bring the magnetic tape into operational contact with stationary tape guides on the apparatus, stationary magnetic heads and a drum-shaped scanning device comprising rotatable magnetic heads. For starting the modes of operation of the apparatus the apparatus 1 comprises a first set 7 of keys on its housing front wall 5. For programming the apparatus 1 and for entering further data the apparatus 1 comprises a second set 8 of keys on its housing front wall 5. Moreover, at its housing front wall 5 the apparatus 1 comprises two display units 9 and 10 by means of which the counts of a tape-length measurement counter and the daytime can be displayed.

The above-mentioned parts of the apparatus 1, such as the drum-shaped scanning device, the tape threading device, the stationary magnetic heads and a plurality of further parts of the apparatus 1 are mounted on a substantially plate-shaped chassis 11 of the apparatus 1. This chassis 11 is shown diagrammatically in FIG. 2, only those parts which are carried by this chassis 11 and which are relevant in the present context being shown diagrammatically. Such a chassis together with the parts it carries is described in the European Patent Application filed under number 92 202 452.2 which corresponds to U.S. Pat. No. 5,330,129, herewith incorporated by reference.

Figure 2:
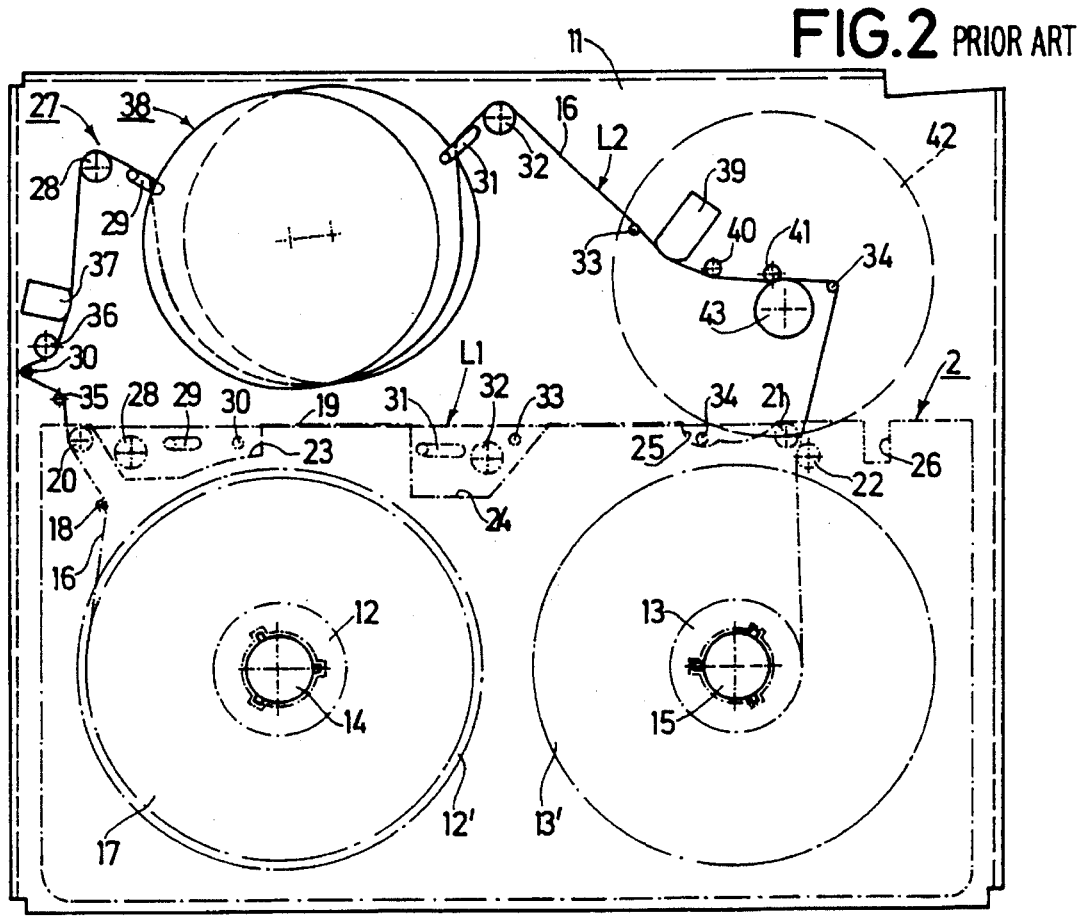
FIG. 2 shows a substantially plate-shaped chassis of the apparatus shown in FIG. 1, which chassis carries a drum-shaped scanning device comprising the rotatable magnetic heads, a tape threading device, by means of which the magnetic tape can be wrapped around the drum-shaped scanning device, and further parts adapted to cooperate with the magnetic tape.

FIG. 2 shows the cassette 2 lowered in its operating position only in dash-dot lines. The cassette 2 accommodates two juxtaposed rotatable reel hubs 12 and 13 each connected to two annular flanges 12' and 13'. When the cassette is lowered into its operating position each of the two reel hubs 12 and 13 is operatively engageable with a respective rotatably drivable reel spindle 14 or 15, which is rotatably supported on the chassis 11. After a cassette 2 has been lowered into its operating position the magnetic tape 16 in the cassette extends along an initial path L1, in which it extends from the first reel hub 12, i.e. from the tape spool 17 wound on this reel hub 12, to the second reel hub 13 via a first tape-guide pin 18 of the cassette, a first tape-guide roller 20 arranged at the location of a long narrow front side 19 of the cassette, along this narrow side 19 to a second tape-guide roller 21 of the cassette, and a second tape-guide pin 22 of the cassette. At the location of its long narrow front side 19 the cassette 2 comprises a shutter, which is pivotably connected to the cassette but which is not shown in FIG. 2. The cassette 2 further has recesses 23, 24, 25 and 26 opening into the narrow front side 19 of the cassette.

The recesses 23, 24 and 25 each accommodate parts of a tape threading device 27 in a thread-out position, which pans engage behind the magnetic tape 16 in its initial path L1 after a cassette 2 has been lowered into its operating position shown in FIG. 2. These parts of the tape threading device 27 are a first tape-guide roller 28, a first tape-guide pin 29, a tape-tension sensing pin 30, a second tape-guide pin 31, a tape-guide roller 32, a third tape-guide pin 33, and a fourth tape-guide pin 34. These parts of the tape threading device 27 are each movable from their thread-out position shown in dash-dot lines in FIG. 2 into a thread-in position, the magnetic tape 16 being moved along during such a movement so that it assumes an operational path L2 when the parts of the tape threading device 27 are in their thread-in positions. In this operational path L2 the magnetic tape 16 extends from the first reel hub 12 or tape spool 17, via the tape-guide pin 18 and the tape-guide roller 20, to a tape-guide pin 35 of the apparatus and from this pin, via the tape-tension sensing pin 30 and a further tape guide 36 of the apparatus, to a first stationary magnetic head 37. From the first magnetic head 37 the magnetic tape 16 extends to a drum-shaped scanning device 38 via the tape-guide roller 28 and the tape-guide pin 38, and from said scanning device to a second stationary magnetic head 39 of the apparatus 1 via the tape-guide pin 31, the tape-guide roller 32 and the tape-guide pin 33. From the second magnetic head 39 the magnetic tape 39 extends to a capstan 41 via a further tape-guide pin 40, which capstan is coaxially connected to a rotatably drivable flywheel 42 and to which a pressure roller 43 can be applied. From the capstan 41 and the pressure roller 43 the magnetic tape 16 extends to the tape-guide pin 34 and from this pin to the second reel hub 13 via the tape-guide roller 21 of the cassette and the tape-guide pin 22. In this operational tape path L2 the magnetic tape 16 extends along a helical path around the drum-shaped scanning device 38 owing to an inclined position of the axes of the tape-guide pins 29 and 31 and of the drum-shaped scanning device 38 relative to the plane of the chassis 11.

Figure 3:
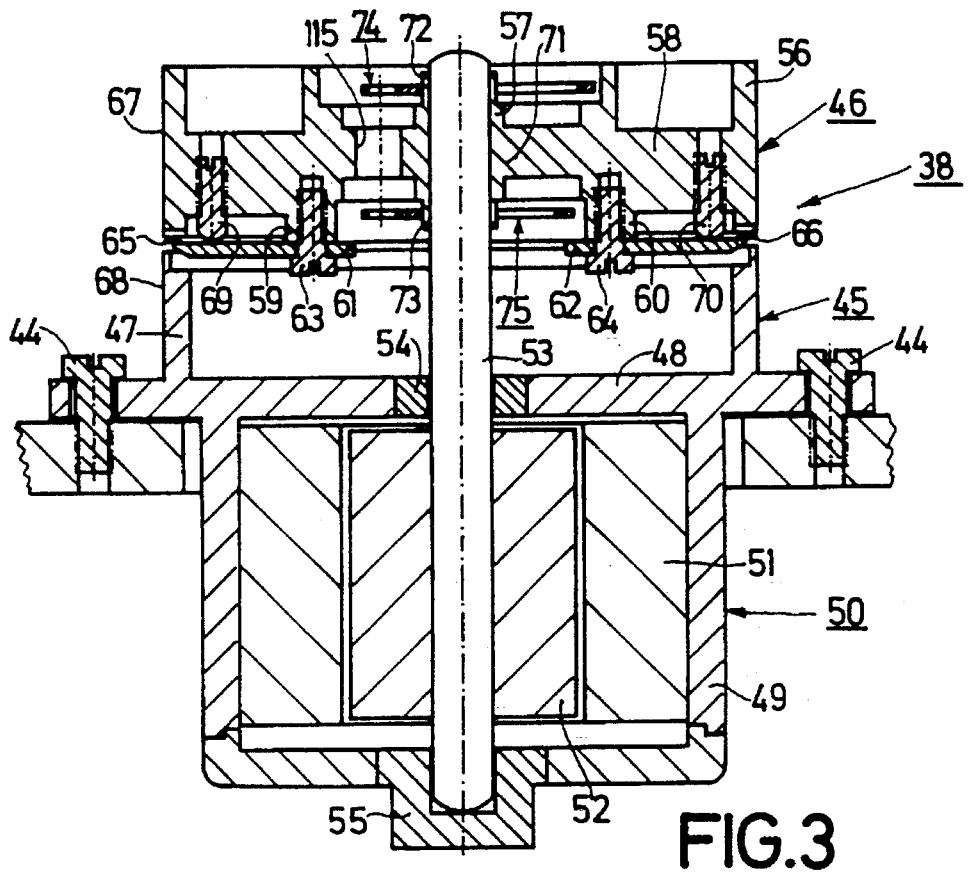
FIG. 3 is diagrammatic cross-sectional view of the drum-shaped scanning device of the apparatus shown in FIGS. 1 and 2, which device comprises a drum-shaped pan clamped onto a rotatable shaft by means of two clamping members and carrying the rotatable magnetic heads.

As is shown in FIG. 3, the drum-shaped scanning device 38 comprises a stationary drum section 45, which is secured to the chassis 11 by means of screws and a rotatable drum section 46, which is coaxial with the stationary drum section. The stationary drum section 45 comprises a hollow cylindrical portion 47 and, connected thereto, a bottom portion 48, to which the housing 49 of a motor 50 is connected. The stator 51 and the rotor 52 of the motor 50 are shown diagrammatically and the rotor is connected to a shaft 53 which projects from the motor 50 and which is journalled by means of two bearings 54 and 55 so as to be exactly rotatable. The motor 50 is shown only diagrammatically in FIG. 3. In practice, such a motor is frequently constructed as, for example, a flat three-phase collectorless motor. The part of the shaft 53 which projects from the motor 50 extends through the stationary drum section.

The rotatable drum section 46 basically comprises a hollow cylindrical portion 56 and a hub 57 as well as a substantially disc-shaped portion 58 connecting the hub 57 to the cylindrical portion. The portion 58 comprises two block-like projections 59 and 60, which project towards the stationary drum section 45 and which each carry a head-mounting plate, 61 and 62 respectively, secured by means of a screw, 63 and 64 respectively. The free ends of the two head-mounting plates 61 and 62 each carry a magnetic head, 65 and 66 respectively, whose free end provided with a transducing gap projects into the area of the cylindrical surfaces 67 and 68 of the hollow cylindrical portion 56 of the rotatable drum section 46 and of the hollow cylindrical portion 47 of the stationary drum section 45. Each of the two head-mounting plates 61 and 62 cooperates with a respective set-screw 69 and 70 mounted in the connecting portion 58 of the rotatable drum section 46 to bring the two magnetic heads 65 and 66 at the same level perpendicular to the shaft 53. In its operational path L2, as already stated, the magnetic tape 16 is passed around the drum-shaped scanning device 38 along a helical path, the magnetic tape 16 then being in contact with the cylindrical surfaces 67 and 68 to allow adjacent oblique tracks to be scanned by the magnetic heads 65 and 66.

For a correct scanning of the tracks on a magnetic tape 16 the magnetic heads 65 and 66 should occupy exactly defined positions which are tolerance independent to a maximal extent. For this purpose it is essential that the rotatable drum section 46 can be mounted on the shaft 53 in a particularly exact and reproducible manner. In order to achieve this the rotatable drum section 46 is clamped onto the shaft 53 in a manner as described hereinafter.

Figure 4:
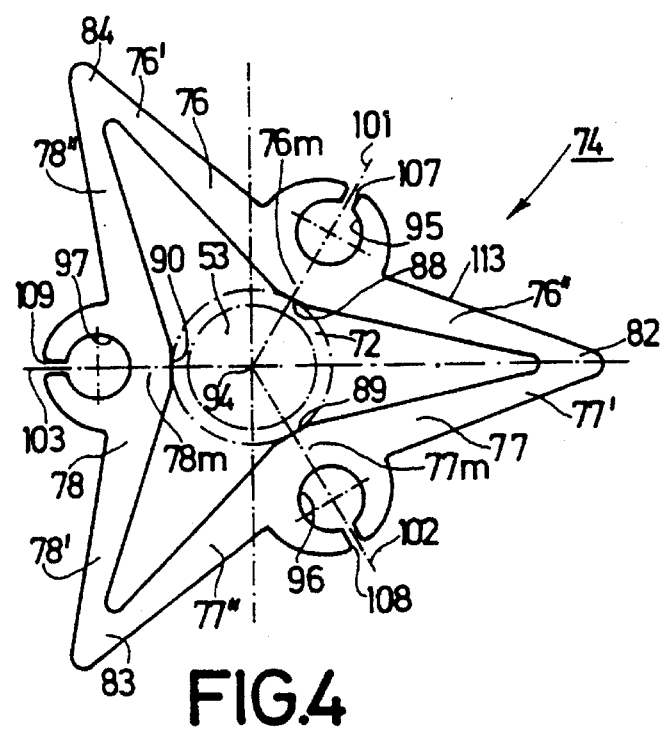
FIG. 4 is a plan view to a larger scale than FIG. 3, showing the one clamping member in accordance with a first variant, which member is arranged nearer the free end of the shaft and clamps the drum-shaped pan of the scanning device shown in FIG. 3 onto the shaft.
Figure 5:
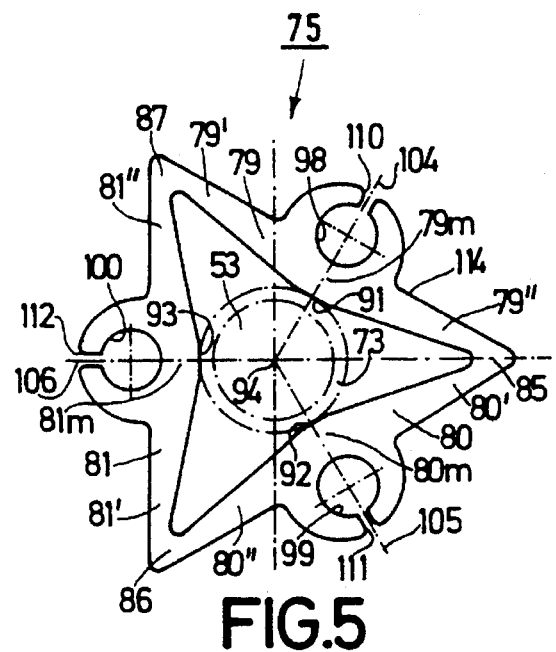
FIG. 5 shows, similarly to FIG. 4, the second clamping member, also in accordance with the first variant, which clamping member is arranged further away from the free end of the shaft and clamps the drum-shaped pan of the scanning device shown in FIG. 3 onto the shaft.

The hub 57 of the rotatable drum section 46 has a substantially non-deformable central portion 71 from which two tubular portions 72 and 73, which are coaxial with the shaft 53, project in opposite axial directions. The two tubular portions 72 and 73 are elastically deformable in radial directions. A releasable clamping member, 74 and 75 respectively, which can be mounted on the respective tubular portion 72 or 73 and surrounds it in a ring-like manner, acts on each of the two portions 72 and 73 to clamp them onto the shaft 53. FIG. 4 is a detailed plan view showing the one clamping member 74 mounted on the portion 72 nearer the free end of the shaft 53. FIG. 5 is a detailed plan view showing the other clamping member 75 mounted on the portion 73 further away from the free end of the shaft 53. In FIGS. 4 and 5 the shaft 53 and the relevant tubular portion 72 and 73 are shown in dash-dot lines.

Each of the two clamping members 74 and 75 comprises three limbs 76, 77, 78 and 79, 80, 81 respectively, having gentle inward slopes, whose respective central portions 76m, 77m, 78m and 79m, 80m, 81m are substantially non-deformable, whose respective side portions 76', 77', 78', 76", 77', 78" and 79', 80', 81', 79", 80", 81", adjacent the central portions, are elastically deformable, and which are interconnected at their ends by respective connecting portions 82, 83, 84 and 85, 86, 87. In its central portion 76m, 77m, 78m and 79m, 80m, 81m each limb 76, 77, 78 and 79, 80, 81 respectively comprises an inwardly directed clamping zone 88, 89, 90 and 91, 92, 93 respectively. In the present case the clamping zones 88, 89, 90 and 91, 92, 93 are equispaced at angles of 120° from one another and each clamping zone is radially movable.

As is apparent in particular from FIG. 3, but also from FIGS. 4 and 5, each clamping member 74, 75 and its three respective clamping zones 88, 89, 90 and 91, 92, 93 are situated at the same level which extends perpendicularly to an axis of symmetry 94 of the clamping member 74, 75 and hence perpendicularly to the shaft 53 and the relevant tubular portion 72 or 73. Moreover, owing to the elastic deformability of the side portions 76', 77', 78', 76", 77", 78" and 79", 80', 81', 79', 80", 81" of the respective limbs 76, 77, 78 and 79, 80, 81 each of the two clamping members 74, 75 is elastically deformable in radial directions. In the present case the limbs 76, 77, 78 and 79, 80, 81, which basically form the two clamping members 74 and 75, are constructed in such a manner that the resistance to bending of their side portions 76', 77', 78', 76", 77", 78" and 79', 80', 81', 79", 80", 81" is as constant as possible over their lengths. Moreover, each of the two clamping members 74 and 75 comprises three application zones 95, 96, 97 and 98, 99, 100, respectively, for an expansion device, which zones are also equispaced at angles of 120° from one another and are movable in radial directions, each application zone 95, 96, 97 and 98, 99, 100 being associated with a respective clamping zone 88, 89, 90 and 91, 92, 93.

As is apparent from FIGS. 4 and 5, each one of the application zones 95, 96, 97 and 98, 99, 100 and an associated clamping zone 88, 89, 90 and 91, 92, 93 respectively are situated on a radial line 101,102, 103 and 104, 105, 106, respectively, so that advantageously each application zone and its associated clamping zone can be moved in the same direction by means of an expansion device. Owing to the above-mentioned construction of the limbs 76, 77, 78 and 79, 80, 81 each of the two clamping members 74, and 75 shown in FIGS. 4 and 5 is substantially non-deformable in radial directions in each of its three areas with an application zone 95, 96, 97 and 98, 99, 100 and an associated clamping zone 88, 89, 90 and 91, 92, 93, respectively, and is elastically deformable in radial directions in the areas situated between the first-mentioned areas and formed by the side portions 76', 76", 77', 77", 78', 78" and 79', 79", 80', 80", 81', 81" and the respective connecting portions 82, 83, 84 and 85, 86, 87, which is advantageous for a proper clamping function and a satisfactory elastic deformability.

Each of the clamping members 74 and 75 has a radial slot 107, 108, 109 and 110, 111,112, respectively, extending from each application zone 95, 96, 97 and 98, 99, 100 in the respective clamping member 74 or 75 up to the respective outer bounding wall 113 or 114 of the respective clamping member 74 or 75, which provides a high elastic deformability. Such clamping members may also be constructed without slots between the application zones and the outer wall, so that in the areas with one application zone and one clamping zone a higher strength is obtained and the clamping members can be manufactured more simply.

As is also apparent from FIGS. 4 and 5, each application zone 95, 96, 97 and 98, 99, 100 is formed by the bounding wall of a hole traversing the respective clamping member 74 or 75 in the axial direction. This is a simple construction and is advantageous for a reliable cooperation with an expansion device.

Moreover, the two clamping members 74 and 75 are constructed to apply clamping forces of different magnitude. In the present case this is achieved in that the two clamping members 74 and 75 are made of the same material, preferably of spring steel or alternatively of spring bronze, of the same material thickness in the axial direction but the two clamping members 74 and 75 have different geometrical shapes, i.e. the length and the width of the two side portions 76', 76", 77', 77", 78", 78" and 79', 79", 80', 80", 81', 81" of the respective limbs 76, 77, 78 and 79, 80, 81 are selected to be different.

In tests carried out in this connection the clamping members shown in FIGS. 4 and 5 were constructed in such a manner that in the non-mounted neutral condition of the clamping members 74 and 75 their clamping zones 88, 89, 90 and 91, 92, 93 had an inscribed circle with a diameter of approximately 7.7 mm. These clamping members 74 and 75 were mounted on tubular portions 72 and 73 having an outer diameter of approximately 8 mm and a wall thickness of approximately 1 mm, which clamping members 74 and 75 were expanded accordingly by an expansion device via the application zones 95, 96, 97 and 98, 99, 100 provided for this purpose. A clamping member 74 of a construction as shown in FIG. 4 enabled clamping forces in excess of 400N to be obtained in each clamping zone. By means of a clamping member 75 as shown in FIG. 5 clamping forces of approximately 200N could be obtained in each clamping zone.

However, different clamping forces can be obtained not only by a different shape of the two clamping members but also by other methods. Preferably, they are obtained in that the two clamping members have the same shape in plan view but simply consist of different materials, for example one clamping member made of spring steel and the other clamping member made of spring bronze, larger clamping forces being attainable with the clamping member made of spring steel. Moreover, different clamping forces can also be obtained in that two clamping members have the same shape in plan view and are made of the same material but have different material thicknesses in the axial direction.

How the two clamping members 74 and 75 are mounted onto the tubular portions 72 and 73 of the drum-shaped scanning device 38 as shown in FIG. 3 will be described in detail with reference to FIGS. 10 and 11. However, it is to be noted here that the clamping member 75 is first mounted on a step of the portion 73, after which the rotatable drum section 46 is slid onto the shaft 53, the clamping member 75 obviously not yet exerting a clamping action on the portion 73. For subsequently expanding the clamping member 75 by means of an expansion device to enable it to be moved from the step of the portion 73 onto the portion 73 itself the connecting portion 58 of the rotatable drum section 46 has three passages 115 which traverse the connecting portion 58 of the drum section 46 in the axial direction and which are equispaced at angles of 120° from one another. Three expansion mandrils of an expansion device can cooperate with the three application zones 98, 99 and 100 of the clamping member 75 through the three passages 115, as described hereinafter with reference to FIG. 11. The section view in FIG. 3 shows only one of the three passages 115.

Figure 6:
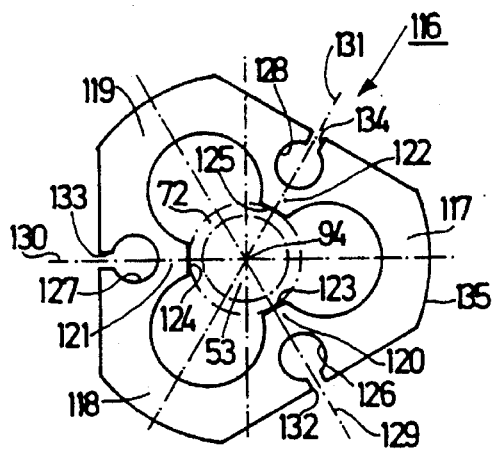
FIG. 6 shows, similarly to FIGS. 4 and 5, a clamping member in accordance with a second variant.

FIG. 6 shows a clamping member 116 in accordance with a second variant. The clamping member 116 comprises three substantially omega-shaped portions 117, 118, 119 interconnected by connecting portions 120, 121, 122. In the area of these connecting portions 120, 121, 122 the clamping member 116 is substantially non-deformable in radial directions and in the area of the omega-shaped portions 117, 118, 119 of the clamping member 116 which are situated between these three connecting portions 120, 21, 122 it is elastically deformable in radial directions. In each of the three connecting areas 120, 21, 122 the clamping member 116 has an inwardly directed clamping zone 123, 124, 125. The three clamping zones 123, 124, 125 are equispaced at angles of 120° from one another and are each radially movable.

In this variant shown in FIG. 6 the clamping member 116 and its three, clamping zones 123, 124, 125 are also situated at the same level which extends perpendicularly to an axis of symmetry 94 of the clamping member 116 and hence perpendicularly to the shaft 53 and the respective tubular portion 72, shown in dash-dot lines in FIG. 6. Moreover, the clamping member 116 is elastically deformable in radial directions and comprises three application zones 126, 127, 128 for an expansion device, which zones are also equispaced at angles of 120° from one another and are movable in radial directions, each application zone 126, 127, 128 being associated with a respective clamping zone 123, 124, 125. Each one of the application zones 126, 127, 128 and an associated clamping zone 123, 124, 125 respectively are situated on a radial line 129, 130, 131 respectively, so that advantageously each application zone and its associated clamping zone can be moved in the same direction by means of an expansion device. The clamping member 116 also has a radial slot 132, 133, 134 extending from each application zone 126, 127, 128, formed by the bounding wall of a hole traversing the clamping member 116 in the axial direction, up to the respective outer bounding wall 135 of the clamping member 116.

Figure 7:
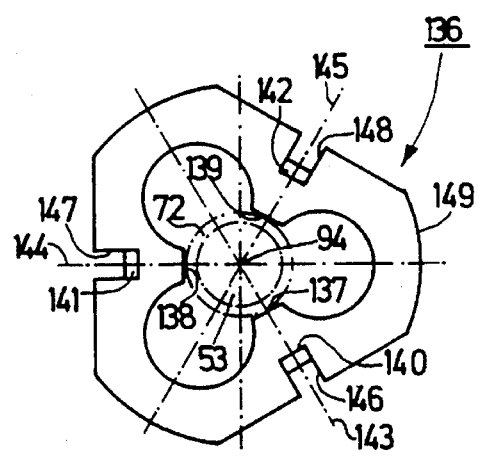
FIG. 7 shows, similarly to FIGS. 4 to 6, a clamping member in accordance with a third variant.

FIG. 7 shows a third variant of a clamping member 136, whose shape bears much resemblance to the shape of the clamping member 116. The clamping member 136 also comprises three inwardly directed clamping zones 137, 138, 139 which are equispaced at angles of 120° from one another and which are also situated at the same level as the clamping member 136, which level extends perpendicularly to the axis of symmetry 94 of the clamping member 136. The clamping member 136, which similarly to the clamping members 74, 75 and 116 shown in FIGS. 4, 5 and 6 are elastically deformable in radial directions, in addition also comprises three application zones 140, 141, 142 for an expansion device, which zones are also equispaced at angles of 120° from one another and are movable in radial directions, each application zone 140, 141, 142 being associated with a respective clamping zone 137, 138, 139 and being situated on a radial line 143, 144, 145 respectively, so that each application zone and its associated clamping zone can be moved in the same direction by means of an expansion device.

In the variant shown in FIG. 7 the clamping zones 140, 141, 142 of the clamping member 136 for an expansion device are each formed by a wall of a tab which extends at right angles to the plane of the clamping member 136. An axial slot 146, 147, 148 in the clamping member 136 extends from each of these tabs 140, 141, 142 in a radial direction up to the outer bounding wall 149 of the clamping member 136.

FIG. 8 shows a fourth variant of a clamping member 150. This clamping member 150 comprises three arcuate portions 151, 152, 153 which are substantially non-deformable in radial directions and which are interconnected by a substantially U-shaped connecting portion 154, 155, 156 each, which connecting portions are elastically deformable in radial directions. Each of the arcuate portions 151, 152, 153 has an inwardly directed rounded portion whose free end 157, 158, 159 forms a clamping zone of the clamping member 150, the three clamping zones 157, 158, 159 being equispaced at angles of 120° from one another and being situated at the same level as the clamping member 150, which level extends perpendicularly to the axis of symmetry 94 of the clamping member 150. In the present case each clamping zone 157, 158, 159 is associated with an application zone 160, 161, 162 for an expansion device, which application zones are also formed by the bounding wall of a hole. Each application zone 160, 161, 162 and its associated clamping zone 157, 158, 159 are again situated on a radial line 163, 164, 165 respectively, so that each application zone and its associated clamping zone can be moved in the same direction by means of an expansion device. The clamping member 150 shown in FIG. 8 does not have any slots extending from the holes serving as application zones up to the outer bounding wall 166 of the clamping member 150.

FIG. 9 shows a fifth variant of a clamping member 167. The clamping member 167 has three crest-like portions 168, 169, 170 which are substantially non-deformable in radial directions and whose rounded inner tops each form a clamping portion 171, 172, 173 of the clamping member 167, which clamping zones are equispaced at angles of 120° from one another. Between the three crest-like portions 168, 169, 170 the clamping member 167 has portions 174, 175, 176 which are elastically deformable in radial directions. Each of these portions 174, 175, 176 has two bulges which are directed away from the axis of symmetry 94 of the clamping member 167 and between the two bulges a dale which is directed towards the axis of symmetry 94. In the dale between the two bulges of the portions 174, 175, 176 which are elastically deformable in radial directions the outer bounding wall 177 of the clamping member 167 forms an application zone 178, 179, 180 for an expansion device for expanding the clamping member 167.

Each one of the application zones 178, 179, 180 and one of the two associated clamping zones 171, 172, 173 are situated on two radial lines 181, 182, 183, 184, 185, 186, which enclose an angle of 60° with one another, each application zone and the two associated clamping zones being movable in opposite directions by means of an expansion device. In FIG. 9 the expansion mandrils 187, 188, 189 of such an expansion device are shown in dash-dot lines. To expand the clamping member 167 the expansion mandrils 187, 188, 189 are moved towards the axis of symmetry 94 of the clamping member 167.

Figure 11:
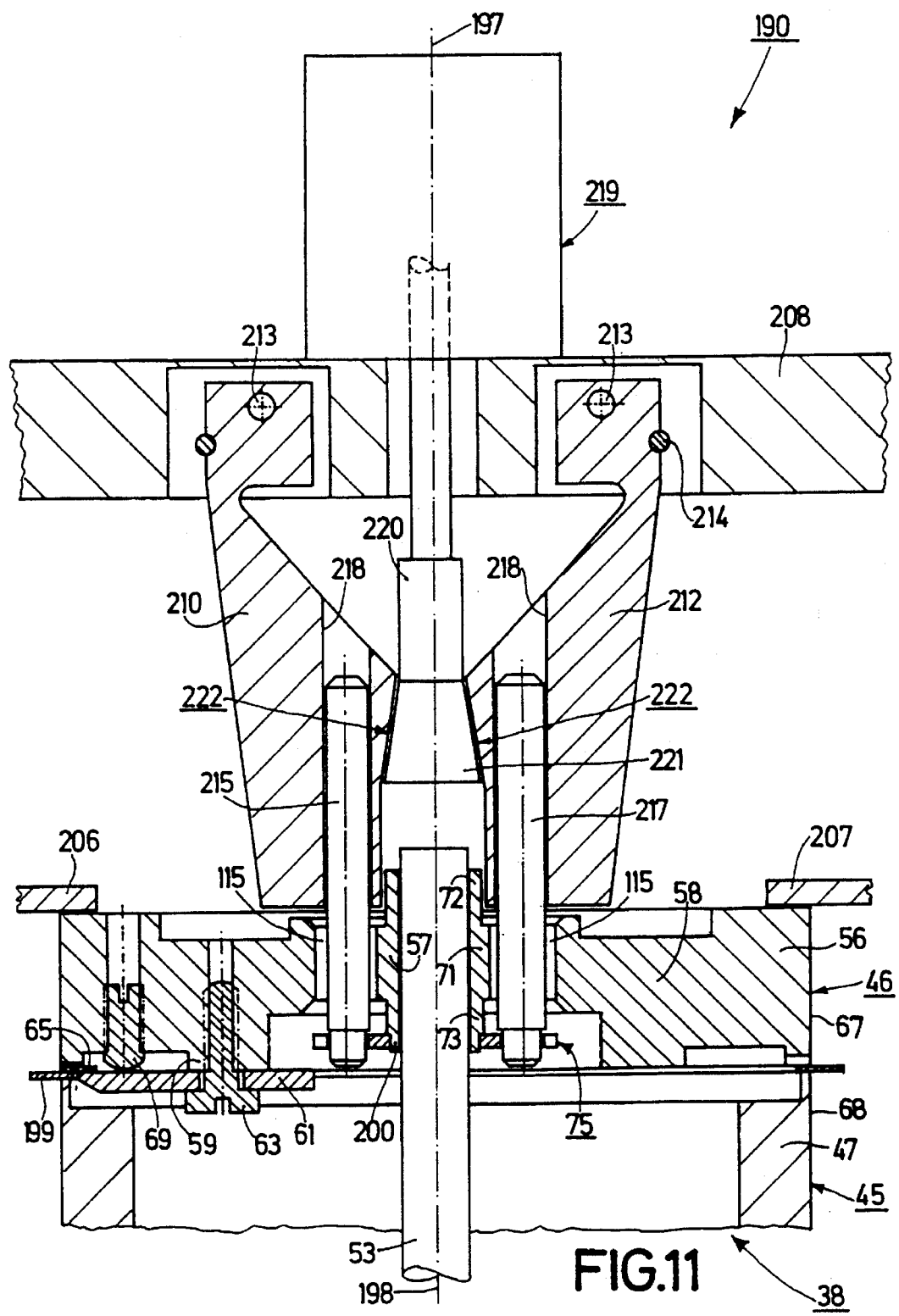
FIG. 11 shows a part of the expansion device to a larger scale than in FIG. 10 and in a sectional view taken along two planes of section which enclose an angle of 120°.

FIGS. 10 and 11 show an expansion device 190 for expanding a clamping member in accordance with one of the variants shown in FIGS. 4 to 8. The expansion device 190 has a base 191 provided with a recess 192. Ducts 194 terminate in the bottom wall 193 of the recess 192 to feed air into the recess 192. In the recess 192 a fixture 195 can be mounted, which fixture can be centred accurately relative to an axis of symmetry 197 by means of a centring mandril 196 which is movable perpendicularly to the bottom wall 193, which fixture can be pressed against the bottom wall 193 by a corresponding movement of the centring mandril 196. The fixture 195 is adapted to receive and hold a drum-shaped scanning device 38 and enables the drum-shaped scanning device 38 to be positioned in such a manner that the axis 198 of the shaft 53 of the scanning device 38 coincides with the axis of symmetry 197 of the expansion device 190. The drum-shaped scanning device 38 is mounted in the fixture 195, which is then mounted into the recess 192 in the base 191, in order to clamp the rotatable drum section 46 onto the shaft 53 of the scanning device 38. A foil-like shim 199 of, for example, 150μm thickness is interposed between the stationary drum section 45 and the rotatable drum section 46 to maintain an accurately defined axial clearance between the rotatable drum section 46 and the stationary drum section 45. The shims may comprise, for example, two foils which are shaped as half rings and which have openings at the location of the magnetic heads 65 and 66, or three foil-like strips inserted radially in the gap between the rotatable drum section 46 and the stationary drum section 45 at angles of 120° from one another.

In such a scanning device 38, as already stated above and as shown in FIG. 11, the clamping member 75 nearest the stationary drum section 45 is first mounted on a step 200 of the tubular portion 73, which step has a smaller diameter, and subsequently the rotatable drum section 46 is mounted onto the shaft 53, without the clamping member 75 exerting a clamping action to clamp the tubular portion 73 onto the shaft 53.

Two rods 201 and 202 project perpendicularly from the base 191 of the expansion device 190. These two rods guide a first platform 203 so as to be movable in the direction of the axis of symmetry 197. The first platform 203 can be moved up and down by means of a diagrammatically shown first pneumatic actuating device 204. The first platform 203 has a passage 205 into which two hold-down elements 206 and 207, which are connected to the first platform 203, project in radial directions relative to the axis of symmetry 197. The hold-down elements 206 and 207 are adapted to cooperate with the periphery 56 of the rotatable drum section 46 at the axial end surface thereof, thereby enabling the rotatable drum section 46 to be held against the shim 199 and the stationary drum section 45.

The expansion device 190 further comprises a second platform 208 which is guided by means of the rods 201 and 202 so as to be movable in the direction of the axis of symmetry 197 with the aid of a second pneumatic actuating device 209. The second platform 208 forms a holder mount carrying three holders 210, 211 and 212 which are equispaced at angles of 120° from one another and which are each movable in a radial direction relative to the axis of symmetry 197. In the present case the holders 210, 211 and 212 are each carried by the holder mount 208 so as to be pivotable about a pivot 213. Moreover, an annular spring 214 acts upon the three holders 210, 211 and 212 and urges the free ends of the holders 210, 211, 212 which are remote from the holder mount 208 towards one another. Each of the three holders 210, 211 and 212 holds an expansion mandril 215, 216 and 217, respectively. Each expansion mandril is mounted in a bore 218 in the relevant holder, for example by means of an adhesive. The three expansion mandrils 215, 216 and 217 are equispaced at angles of 120° from one another with respect to the axis of symmetry 197, which can be aligned with the axis 198 of the shaft 53 carrying the hub 57 of the rotatable drum section 46.

The expansion device 190 further comprises a third pneumatic actuating device 219 for moving the expansion mandrils 215, 216 and 217. The pneumatic actuating device 219 comprises a cylindrical piston 220 whose distal end diverges into a frustoconical portion 221. The portion 221 constitutes the actual actuating device for the expansion mandrils 215, 216 and 217, by means of which each of the three expansion mandrils is movable in a radial direction relative to the axis of symmetry 197 with its free end which is adapted to cooperate with an application zone of a clamping member. For this purpose a link motion 222 is arranged between each of the holders 210, 211 and 212, which are movably connected to the platform 208, and the frustoconical portion 221 of the expansion device 190, which frustoconical portion can be moved relative to the second platform 208 in the direction of the axis of symmetry 197 by means of the third pneumatic actuating device 219, which link motion enables the holders 210, 211 and 212 and at least the free ends of the expansion mandrils 215, 216 and 217 secured to these holders to be moved in a radial direction relative to the axis of symmetry 197 when the portion 221 is moved in the direction of the axis of symmetry 197.

In principle, the following operations are carried out to clamp the rotatable drum section 46 onto the shaft 53. First, in addition to the expansion device 190, a drum-shaped scanning device 38 is mounted in a fixture 195, after which the fixture 195 with the scanning device 38 is mounted in the recess 192 in the base 191 and is positioned and held therein by means of the centering mandril 196. The shim 199 is then situated between the rotatable drum section 46 and the stationary drum section 45, the clamping member 75 nearest the stationary drum section 45 being mounted on the step 200 of the tubular portion 73.

After this, the first platform 203 is lowered towards the scanning device 38, the hold-down elements. 206 and 207 abutting against the rotatable drum section 46 and holding this drum section against the shim 199 and the stationary drum section 45. Subsequently, the second platform 208 is moved towards the scanning device 38 by means of the second actuating device 209 until the free ends of the expansion mandrils 215, 216 and 217 cooperate with the application zones of the previously mounted clamping member 75 through the passages 115 in the rotatable drum section 46. By means of the third pneumatic actuating device 219 and via the frustoconical portion 221 and the link motions 222 the holders 210, 211 and 212 and, consequently, the expansion mandrils 215, 216 and 217 are then moved in radially outward directions, causing the previously mounted clamping member 75 to be expanded. After this, the second platform 208 is moved away from the scanning device 38 until the expanded clamping member 75 has reached its clamping level on the tubular portion 73. Subsequently, the first platform 203 is slightly moved away from the scanning device 38, so that the hold-down elements 206 and 207 become inoperative, after which the centring mandril 196 is lifted so that it releases the fixture 195, and air is fed into the recess 192 through the ducts 194, as a result of which the fixture 195 is supported on an air film. In this way the fixture 195 and the scanning device 38 with the tubular portion 73 can adapt itself substantially freely to the position of the clamping member 75, which has been expanded by means of the expansion mandrils 215, 216, 217. Subsequently, the frustoconical portion 221 is moved back towards the scanning device 38 by means of the third pneumatic actuating device 219, as a result of which the expansion mandrils 215, 216 and 217 are moved radially inward under the influence of the force exerted by the clamping member 75, the clamping member 75 engaging with the tubular portion 73 and thus clamping the tubular portion 73 onto the shaft 53.

After this, the second platform 208 with the expansion mandrils 215, 216 and 217 is moved away from the scanning device 38 until the second clamping member 74 can be moved in the direction indicated by an arrow 223 (see FIG. 10) by means of a device, not shown, to centre it on the scanning device 38 and hold it in this position Moreover, the fixture 195 is again held by means of the centring mandril 196 and the hold-down elements 206 and 207 are actuated. Subsequently, the second platform 208 is again moved towards the scanning device 38, causing the free ends of the expansion mandrils 215, 216 and 217 to cooperate with the application zones of the clamping member 74. Once the clamping member 74 cooperates with the expansion mandrils 215, 216 and 217 these mandrils are again moved in radially outward directions, as a result of which the clamping member 74 is expanded. After this, the second platform 208 is moved towards the scanning device 38 until the clamping member 74 has reached its clamping level on the first tubular portion 72 of the rotatable drum section 46. Once this is the case the hold-down elements 206 and 207 are rendered inoperative and an air film for supporting the fixture 195 is produced, after which the expansion mandrils 215, 216 and 217 are disengaged from the portion 221 under the influence of the force exerted by the clamping member 74, the clamping member 74 engaging with the tubular portion 72 and thus also clamping the first tubular portion 73 onto the shaft 53. After this, the second platform 208 and the first platform 203 are moved away from the scanning device 38 and the centring mandril 196 is rendered inoperative, upon which the fixture 195 with the scanning 38 is removed from the expansion device 190.

All the variants described above have the following advantages. When each of the two tubular portions of the hub of the rotatable drum section is clamped onto the shaft of the scanning device, the rotatable drum section floats on an air film to position it during clamping and, as a result, positioning is effected with only very small forces, so that substantially no external forces act upon the rotatable drum section during clamping. When each clamping member is tightened, external reactive forces are taken up by the expansion device only. This results in a trouble-free and particularly exact clamping with a minimal axial and a minimal radial runout. Moreover, the advantage is obtained that substantially without any mechanical contact with the relevant tubular portion the two clamping members can be brought to their clamping level areas on the respective tubular portions, after which they are movable in exactly radial directions relative to the respective tubular portion with their clamping projections, so that no undefined frictional forces occur between the free ends of the clamping projections and the respective tubular portion, always yielding accurately defined clamping forces which are equal to each other and which are always reproducible. Moreover, the one-level construction of the clamping members and their clamping projections and the movability of the clamping projections in exactly radial directions also ensure that the clamping forces exerted by the clamping members act only in exactly radial directions and, that no force components in axial directions occur, so that also in the long run the rotatable drum section does not tend to be displaced along the shaft in the axial direction. An additional advantage is that only a single clamping member is needed for clamping a tubular portion onto the shaft. Another advantage is that clamping with only one clamping member per tubular portion can be effected very easily and simply in a mechanized process.

In the variant described with reference to FIGS. 1 to 5, the rotatable drum section of a video recorder comprises two tubular portions which project from a central portion in opposite directions and which each cooperate with one clamping member. However, such a rotatable drum section may alternatively be of a construction comprising only one tubular portion which preferably cooperates with two axially spaced clamping members. However, in the case of such a rotatable drum section with only one tubular portion this tubular portion can also be clamped onto the shaft by means of a single clamping member.

The invention has been described herein for a helical-scan magnetic-tape recorder. The steps in accordance with the invention for clamping the drum section carrying the rotatable magnetic heads onto the shaft of the drum-shaped scanning device of such a helical-scan magnetic-tape recorder are found to be very effective and advantageous in such an arrangement. However, the steps in accordance with the invention can be applied advantageously not only in arrangements such as helical-scan magnetic-tape recorders but also in other arrangements in which extremely precise clamping of a part on a shaft is required.

I claim:

1. A clamping member, comprising:

a symmetrical, planar, annular member defining an axis of symmetry, said annular member including an outer bounding wall, at least three inwardly directed clamping zones circumferentially equispaced and extending in the plane defined by said annular member, a respective application zone, radially aligned with each of said clamping zones, for receiving an expansion device, each application zone including a slot which traverses the annular member in the axial direction and extends radially to the outer bounding wall, the annular member being (i) substantially non-deformable in circumferential areas each including a said application zone and a radially aligned clamping zone and (ii) elastically deformable in circumferential regions between said circumferential areas for biasing each of said application zones in the radial direction relative to the axis of symmetry.

2. A clamping member as claimed in claim 1, characterized in that each application zone is formed by the bounding wall of a hole traversing the clamping member in the axial direction.

3. A clamping member according to claim 1, wherein said annular member has only three of said clamping zones.

4. A clamping member, comprising:

a symmetrical, planar, annular member defining an axis of symmetry, said annular member including at least three inwardly directed clamping zones circumferentially equispaced and extending in the plane defined by said annular member, an application zone associated with each of said clamping zones for receiving an expansion device, the annular member being (i) substantially non-deformable in circumferential areas each including a said clamping zone and (ii) elastically deformable in circumferential regions between said circumferential areas for biasing each of said application zones in the radial direction relative to the axis of symmetry, the application zones being located in said elastically deformable zones so that inward movement in the radial direction of said application zones by the expansion device causes radial outward movement of said clamping zones.

5. A clamping member as claimed in claim 4, characterized in that one application zone and one of the two associated clamping zones of a clamping member (167) are situated on two radial lines which enclose an angle of 60° with one another.

6. An arrangement as claimed in claim 4, characterized in that each application zone is formed by the bounding wall of a hole traversing the clamping member in the axial direction.

7. A clamping member according to claim 4, wherein said annular member includes an outer bounding wall, and each application zone includes a slot which traverses the annular member in the axial direction and extends radially to the outer bounding wall.

8. A clamping member according to claim 7, wherein said annular member has only three of said clamping zones.

9. A clamping member according to claim 4, wherein said annular member has only three of said clamping zones.

10. A clamping member as claimed in claim 9, characterized in that the clamping member is substantially non-deformable in radial directions in its three areas having one clamping zone each and has portions which are elastically deformable in radial directions between said three areas and which are shaped as two bulges directed away from the axis of symmetry of the clamping member and having between the two bulges a dale directed towards the axis of symmetry, and in the dale between the two bulges of each of the portions which are elastically deformable in radial directions the outer bounding wall of the clamping member forms an application zone for an expansion device.

11. An arrangement, comprising:

a) a shaft having an axis of rotation;

b) a part having a hub mounted on said shaft and including a tubular portion, said tubular portion being coaxial with said shaft and elastically deformable in radial directions; and c) an annular, planar clamping member for clamping the tubular portion on said shaft, said clamping member being clamped on said shaft and including at least three inwardly directed coplanar clamping zones equispaced in the circumferential direction of said clamping member for clamping said tubular portion, said clamping zones extending perpendicular to said shaft axis of rotation, and an application zone associated with each of said clamping zones for receiving an associated mandril of an expansion device, the clamping member being (i) substantially non-deformable in circumferential areas each including a said application zone and (ii) elastically deformable in circumferential regions between said circumferential areas for biasing each of said application zones in the radial direction relative to said axis of rotation, and said part mounted on said shaft further including passages, each associated with a said application zone, extending in the axial direction of said shaft and through which a mandril of the expansion device is insertable to engage a respective application zone.

12. An arrangement as claimed in claim 11, characterized in that the hub of the part comprises a substantially non-deformable central portion from which two of said tubular portions, which are coaxial with the shaft, project in opposite axial directions, a respective said clamping member acting upon each tubular portion, and each of the clamping members having three clamping zones which are equispaced at angles of 120° from one another and three application zones for said expansion device, which application zones are also equispaced at angles of 120° from one another.

13. An arrangement as claimed in claim 12, characterized in that the two clamping members are constructed to apply clamping forces of different magnitude.

14. An arrangement as claimed in claim 13, characterized in that one clamping member is made of spring steel and the other clamping member is made of spring bronze.

15. An arrangement as claimed in claim 14, characterized in that the part has three of said passages which traverse the part in the axial direction and are equispaced at angles of 120° from one another for receiving three expansion mandrils of an expansion device adapted to cooperate with the three application zones of the clamping member through the three passages.

16. An arrangement as claimed in claim 13, characterized in that the part has three of said passages, which traverse the part in the axial direction and which are equispaced at angles of 120° from one another, each for receiving a respective one of three expansion mandrils of the expansion device adapted to cooperate with the three application zones of the clamping member through the three passages.

17. An arrangement as claimed in claim 12, characterized in that the part has three of said passages, which traverse the part in the axial direction and which are equispaced at angles of 120° from one another, each for receiving a respective one of three expansion mandrils of the expansion device adapted to cooperate with the three application zones of the clamping member through the three passages.

18. An arrangement as claimed in claim 11, characterized in that the part has three of said passages, which traverse the part in the axial direction and which are equispaced at angles of 120° from one another, each for receiving a respective one of three expansion mandrils of the expansion device adapted to cooperate with the three application zones of the clamping member through the three passages.

19. An arrangement as claimed in claim 11, characterized in that each application zone is formed by the bounding wall of a hole traversing the clamping member in the axial direction.

20. An arrangement according to claim 11, wherein said annular member has only three of said clamping zones.

21. An arrangement according to claim 11, wherein said clamping member has an outer bounding wall, and each application zone includes a slot which traverses the annular member in the axial direction and extends radially to the outer bounding wall.

22. An arrangement according to claim 11, wherein said hub includes two axially spaced tubular portions and a respective said clamping member clamping each of said tubular portions, said clamping members applying a different clamping force to the respective tubular portions.

23. A rotary scanning device according to claim 22, wherein said annular member has only three of said clamping zones.

24. A rotary scanning device according to claim 22, wherein said clamping member had an outer bounding wall, and each application zone includes a slot which traverses the annular member in the axial direction and extends radially to the outer bounding wall.

25. An arrangement according to claim 24, wherein said hub includes two axially spaced tubular portions and a respective said clamping member clamping each of said tubular portions, said clamping members applying a different clamping force to the respective tubular portions.

26. An arrangement as claimed in claim 25, characterized in that the two clamping members are constructed to apply clamping forces of different magnitude.

27. An arrangement as claimed in claim 26, characterized on that one clamping member is made of spring steel and the other clamping member is made of spring bronze.

28. A rotary scanning device for scanning a magnetic tape, comprising:
   a) a stationary drum section;
   b) a rotatable shaft having an axis of rotation;
   c) a rotary drum section mounted on said rotatable shaft and rotatable relative to said stationary drum section, said rotary drum section having a hub mounted on said shaft and including a tubular portion coaxial with said shaft and elastically deformable in radial directions; and
   d) an annular, planar clamping member for clamping the tubular portion on said shaft, said clamping member being clamped on said shaft and including
      at least three inwardly directed coplanar clamping zones equispaced in the circumferential direction of said clamping member for clamping said tubular portion, said clamping zones extending perpendicular to said shaft axis of rotation, and
      an application zone associated with each of said clamping zones for receiving an associated mandril of an expansion device,
      the clamping member being (i) substantially non-deformable in circumferential areas each including a said application zone and (ii) elastically deformable in circumferential regions between said circumferential areas for biasing each of said application zones in the radial direction relative to said axis of rotation, and
      said rotary drum further including passages, each associated with a said application zone, extending in the axial direction of said shaft and through which a mandril of the expansion device is insertable to engage a respective application zone of said clamping member.

29. A rotary scanning device for scanning a magnetic tape, comprising:
   a) a stationary drum section;
   b) a rotatable shaft having an axis of rotation;
   c) a rotary drum section mounted on said rotatable shaft and rotatable relative to said stationary drum section, said rotary drum section having a hub mounted on said shaft, said hub including a substantially non-deformable central portion and first and second tubular portions projecting from said central portion in opposite axial directions, said tubular portions each being coaxial with said shaft and elastically deformable in radial directions; and
   d) first and second annular, planar clamping members each for clamping a respective said tubular portion on said shaft, each clamping member being clamped on the respective tubular portion and including
      at least three inwardly directed coplanar clamping zones equispaced in the circumferential direction of said clamping member for clamping the respective said tubular portion, said clamping zones extending perpendicular to said shaft axis of rotation, and
      an application zone associated with each of said clamping zones for receiving an associated mandril of an expansion device,
      the clamping member being (i) substantially non-deformable in circumferential areas each including a said application zone and (ii) elastically deformable in circumferential regions between said circumferential areas for biasing each of said application zones in the radial direction relative to said axis of rotation, and
      said first clamping member exerting a first clamping force on said first tubular portion and said second clamping member exerting a second, substantially different clamping force on said second tubular portion, said first clamping force being selected to provide radial positioning of said rotary drum section on said shaft while permitting axial movement along said shaft and said second clamping force being selected to axially fix said rotary drum section on said shaft.

30. A rotary scanning device according to claim 29, wherein said first clamping member consists of spring steel and said second clamping member consists of spring bronze.

* * * * *